Figure 1:
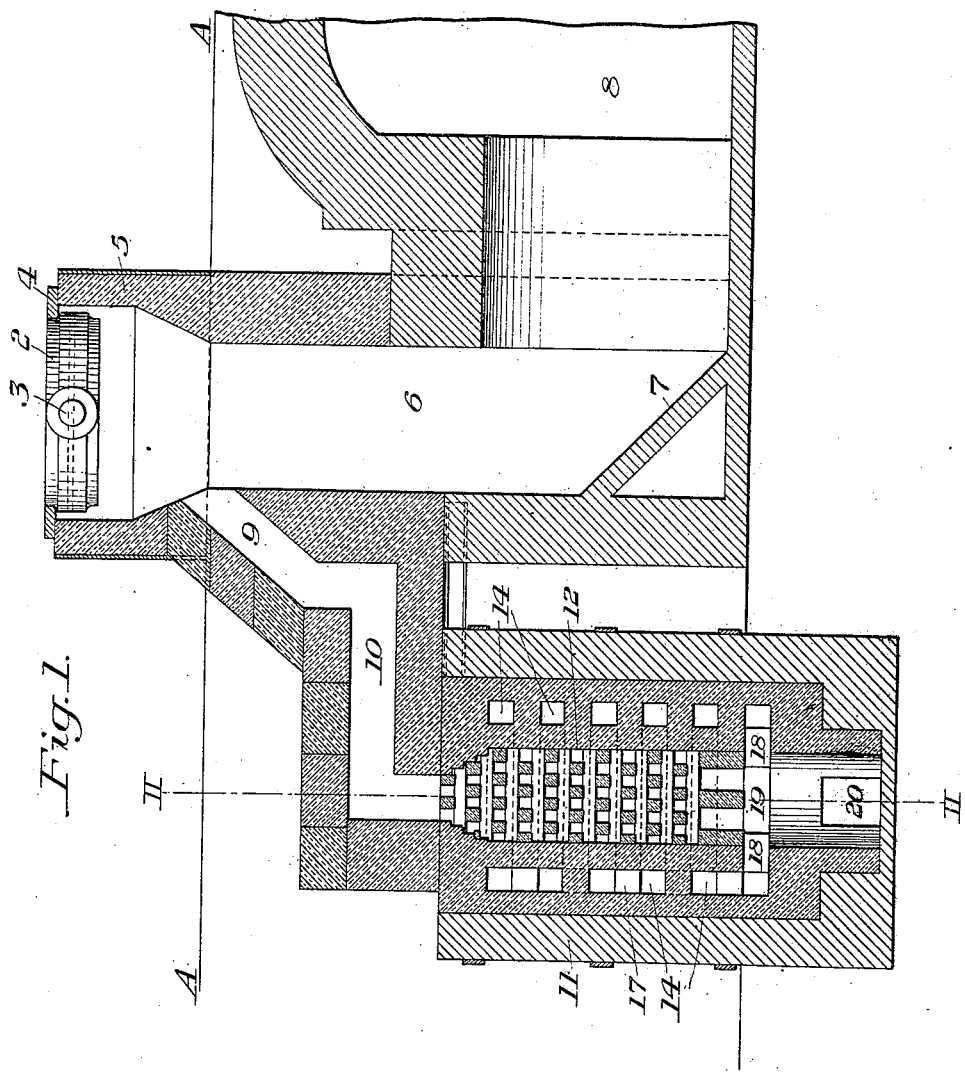

H. E. SMYTHE.
GLASS POT FURNACE.
APPLICATION FILED JUNE 8, 1910.

1,016,105.

Patented Jan. 30, 1912.
2 SHEETS—SHEET 1.

WITNESSES
R. A. Balderson
Walter Tamariss

INVENTOR
Horace E. Smythe
by Bakewell Byrnes & Parmelee
his attys

H. E. SMYTHE.
GLASS POT FURNACE.
APPLICATION FILED JUNE 8, 1910.
1,016,105.
Patented Jan. 30, 1912.
2 SHEETS—SHEET 2.
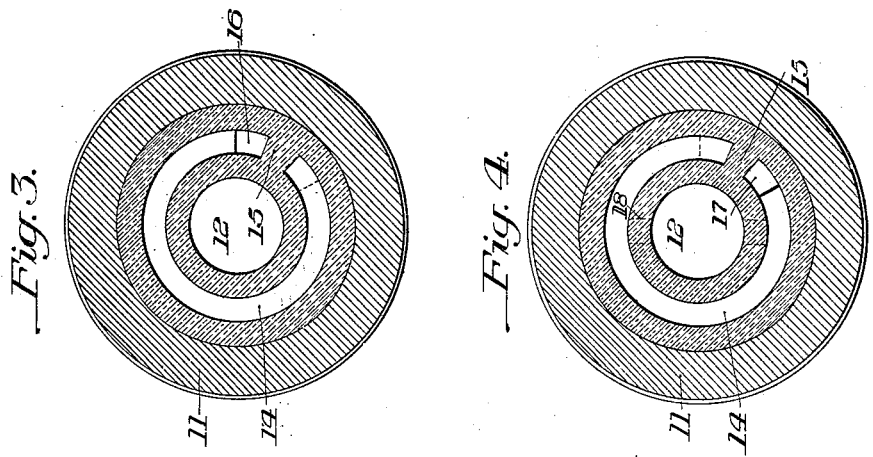
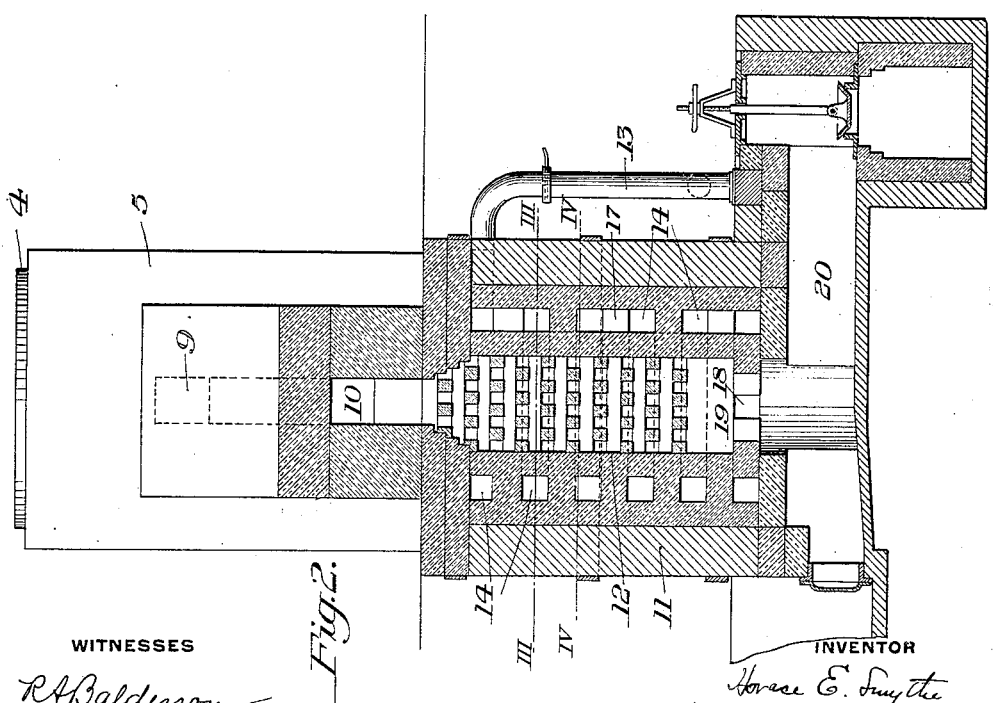

UNITED STATES PATENT OFFICE.

HORACE E. SMYTHE, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

GLASS-POT FURNACE.

1,016,105. Specification of Letters Patent. Patented Jan. 30, 1912.

Application filed June 8, 1910. Serial No. 565,858.

*To all whom it may concern:*

Be it known that I, HORACE E. SMYTHE, a resident of Pittsburgh, in the county of Allegheny and State of Pennsylvania, have invented a new and useful Improvement in Glass-Pot Furnaces, of which the following is a full, clear, and exact description, reference being had to the accompanying drawings, forming part of this specification, in which—

Figure 1 is a longitudinal vertical section, showing one form of my furnace; Fig. 2 is a vertical section on the line II—II of Fig. 1; and Figs. 3 and 4 are cross sections on the lines III—III and IV—IV, respectively of Fig. 2.

My invention relates to the heating of glass pots, particularly pots used for drawing glass therefrom, which pots are turned over and drained to remove from the pot cavity the surplus glass remaining therein after the drawing operation.

The object of the invention is to provide a simple and effective system, by which producer gas may be used to give the necessary high heat for melting out the surplus glass in the tilted or reversed pot.

These pots are supported above a "cave" or vertically extending hole, the bottom of which receives the glass drippings. My invention provides for lateral inlet of heated products of combustion resulting from the burning of the gas with preheated air in a recuperator system, the preheated air being supplied to the gas and ignited so as to burn in the checker-work or heat-retaining bodies of the recuperator.

In the drawing, 2 represents a reversible glass pot, which is preferably mounted on trunnions 3, and is provided with top and bottom glass-receiving cavities.

4 is a top-stone, which may be lifted or moved to allow turning over of the pot. This pot sets in a refractory lined furnace 5, the bottom of which opens into a cave 6, preferably having an inclined bottom 7, which directs the glass drippings laterally.

8 is a tunnel opening into the bottom of the cave, this tunnel preferably being common to several of these caves, under several drawing pots, so that the operator may get access to the glass drippings.

A port 9 opens laterally through the side wall of the furnace or cave, and this port leads from a channel 10, extending from the top of the recuperator 11. The channel and port are preferably formed in the refractory brick of the structure. The recuperator is provided with a central combustion chamber 12, which is preferably filled with regenerative checker-work which becomes highly heated and retains such heat. The air is supplied through pipe 13 to the upper of a series of annular spaces 14, contained within the wall of the recuperator and serving to heat the incoming air. Each of these annular spaces is provided with a baffle or partition 15, which is at the opposite end of the annular chamber, from that of the inlet, so that the air is compelled to flow around each annular cavity before descending into the next heating chamber. Figs. 3 and 4 show the arrangement of two of these chambers, 16 being the outlet of one chamber, and 17 being the outlet of the next chamber. By this system, air enters one portion of each annulus, thence flows around the annulus and thence down the outlet port into the next annulus where it flows around to the outlet and so on. The bottom annulus has two or more openings 18, leading into the mixing chamber 19, below the recuperator. The gas enters this chamber through the port 20, and may be producer gas or any other suitable character of gas for combustion purposes. The entering air is heated in the successive annular chambers and mixes with the entering producer gas in the mixing chamber 19, at the top of which it is ignited. Combustion then takes place in the recuperator chamber, thus highly heating the checker-work therein and the products of combustion pass through the flue 10 and port 9 into the cave or furnace, this upwardly inclined port throwing the heat directly against the lower cavity of the pot, so as to raise the temperature of the glass therein and cause it to drop from the pot into the cave. The highly heated checker-work radiates heat through the walls to the air chambers, so that the air is heated to a high temperature before it is combined with the gas.

The ground level is indicated at A—A, the well or cave, the recuperator, etc., being preferably located beneath said level.

The advantages of my invention will be apparent to those skilled in the art. The system provides for obtaining the necessary high temperature for melting the refuse glass out of the pot; the recuperator continuously heats the incoming air, this being assisted by the checker-work or heat-retaining bodies of the combustion chamber; and the lateral inlet of the heated products of combustion allows the glass to drop vertically down the well or cave 6, while directing these products into the furnace and preferably upwardly against the pot.

In actual practice, this furnace has been found to be economical and highly effective, giving the necessary high heat for melting out the glass.

In the operation of the furnace with the reversible pot shown, a glass article is drawn from the glass in the upper cavity of the pot, while the refuse glass is being melted out of the lower cavity. The pot is then turned over, the cleaned out cavity is filled with fresh glass, and the refuse glass is melted out of the other cavity while the glass-drawing operation goes on with the glass batch in the cleaned-out cavity.

Many changes may be made in the form and arrangement of the recuperator, the air-heating passages, etc., without departing from my invention.

I claim:

1. A glass drawing furnace containing a reversible pot system with a well below the pot, said well having a lateral inlet port in its wall directed toward the pot, a regenerative system arranged to preheat air and burn the same with gas, and a channel directing the products of combustion from said regenerative system to said lateral port; substantially as described.

2. A glass drawing furnace having a reversible pot and a well below the same, the wall of the well having a lateral port directed toward the bottom of the pot, and a recuperative system connected to the opening and arranged to discharge highly heated products of combustion therethrough; substantially as described.

3. A glass drawing furnace having a reversible pot with a well below the same, the wall of the well having a lateral opening directed toward the bottom of the pot, a combustion chamber having an outlet leading to said opening, an air-heating system surrounding the combustion chamber, and a channel leading from the air-heating chamber to the inlet of said combustion chamber, substantially as described.

4. A glass drawing furnace having a reversible pot with a well below the same, the wall of the well having a lateral opening directed toward the bottom of the pot, a recuperator connected with said opening, an air-heating system surrounding the recuperator and arranged to direct preheated air into the inlet of the recuperator, and a gas supply leading to said inlet, substantially as described.

5. A glass drawing furnace having a reversible pot with a well below the same, the wall of the well having a lateral opening, a recuperator arranged to discharge heated products of combustion through said lateral opening toward the bottom of the pot, an air-heating flue surrounding the recuperator and arranged to direct the preheated air into a mixing chamber at the entrance of said recuperator, and a gas supply channel leading to said mixing chamber, substantially as described.

6. A glass drawing furnace having a reversible pot, and a well below the same, said well having an inwardly inclined lateral inlet for hot products of combustion, a recuperator below the level of the pot furnace and connected with said inlet, and an air-heating system combined with said recuperator, substantially as described.

In testimony whereof, I have hereunto set my hand.

HORACE E. SMYTHE.

Witnesses:
J. E. HINES,
H. M. CORWIN.